United States Patent
Hibino et al.

(10) Patent No.: US 6,252,625 B1
(45) Date of Patent: Jun. 26, 2001

(54) FILM IMAGE READING APPARATUS AND METHOD

(75) Inventors: Hideo Hibino, Yamato; Kazuyuki Kazami; Norikazu Yokonuma, both of Tokyo; Hisashi Okutsu, Yokohama, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/961,202

(22) Filed: Oct. 30, 1997

(30) Foreign Application Priority Data

Oct. 30, 1996 (JP) .................................................. 8-288646

(51) Int. Cl.$^7$ .................................................. H04N 5/253
(52) U.S. Cl. .................................................. 348/96
(58) Field of Search .................................. 348/96, 97, 98, 348/99, 221, 373, 374; 358/527, 487; 355/18, 40; H04N 5/253

(56) References Cited

U.S. PATENT DOCUMENTS

| | | | |
|---|---|---|---|
| 5,467,168 | * 11/1995 | Kinjo et al. | 355/77 |
| 5,631,696 | * 5/1997 | Tanaka et al. | 348/96 |
| 5,633,733 | * 5/1997 | Myiazawa | 358/527 |
| 5,638,115 | * 6/1997 | Imai | 348/98 |
| 5,706,457 | * 1/1998 | Dwyer et al. | 395/349 |
| 5,729,284 | * 3/1998 | Ishii et al. | 348/96 |
| 5,745,214 | * 4/1998 | Yoknuma et al. | 355/18 |
| 5,751,343 | * 5/1998 | Hibino et al. | 348/96 |

FOREIGN PATENT DOCUMENTS 5-75922  3/1993  (JP) .

* cited by examiner

*Primary Examiner*—Chris Kelley
*Assistant Examiner*—Tung Vo

(57) ABSTRACT

A film image reading apparatus and method which more quickly reads images from a cartridge of developed film for production of thumbnail images which are displayed on a monitor. The apparatus reads a first image from the film cartridge using imaging condition values associated with each frame image. These imaging condition values include photographic information such as, exposure value, white balance value and focus adjustment. In the event that the first or current image being read by the apparatus is the start of a series of photographic images, the film image reading apparatus will set the exposure value, the white balance value and the focus adjustment only once for the entire series. The remaining images of the series are then read using the imaging condition values of the first image of the series. In this manner, these imaging condition values are not reset for each image and time is saved in reading the series of images from the film.

20 Claims, 8 Drawing Sheets

FILM IMAGE READING APPARATUS AND METHOD

CROSS-REFERENCE TO RELATED APPLICATIONS

This application is based upon and claims priority of a Japanese Patent Application No. 08-288646 filed Oct. 30, 1996, the contents of which are incorporated herein by reference.

BACKGROUND OF THE INVENTION

1. Field of the Invention

The present invention relates to a film image reading apparatus and method that reads images on developed film in which multiple images have been recorded, and, more particularly, the present invention relates to an apparatus and method for reading images on film using image condition values associated with the first image for the reading of all subsequent images in a series.

2. Description of the Related Art

Film image display devices are known in the art for displaying images on a monitor by reading images from developed film contained in a cartridge (e.g., Laid-open Patent Publication No. 5-75922). This type of film image display apparatus consists of a reading device that reads images from specified frames of the developed film and converts them into image signals. The image display apparatus contains a film advancing device that advances the film contained in the cartridge. As the developed film is advanced by this film advancing device, the images of a desired frame are read by a reading device. During this reading process the exposure value, white balance value and focus are adjusted, and the image is converted into an image signal for display on a monitor.

Also known in the art is a thumbnail image display apparatus that reads the images of multiple frames of film in order to display these images on a monitor. Another term used to identify these thumbnail images is "index images." In this thumbnail image display apparatus, the images of multiple frames are read to obtain the thumbnail image data. This thumbnail image data is stored in memory and retrieved on an as needed basis for display.

A problem encountered in the known art is the amount of time needed to display a complete set of thumbnail images from a film cartridge. Since every frame image on the film cartridge must be read, adjusted for exposure, white balance and focus, a large amount of time is required to accomplish this process for a series of images on an entire film cartridge.

SUMMARY OF THE INVENTION

An object of the present invention is to provide a film image reading apparatus that can read multiple images recorded on film for display as thumbnail images in a short period of time.

Objects and advantages of the present invention are achieved in accordance with embodiments by a film image reading apparatus having an exposure value detection unit and an imaging unit. The exposure value detection unit, using an imaging circuit, detects the exposure values of the images that have been recorded on film. The imaging unit, employing a charged coupled display ("CCD") and processor, captures each image on film in which multiple images have been recorded. The imaging unit captures the first image and subsequent images on a film based upon the exposure value supplied by the exposure value detection unit for the first image. Therefore, using this apparatus and method it is not necessary to detect the exposure values for subsequent images, other than the first image, and the time required to read multiple images recorded on the film is significantly reduced.

This savings in reading time of images is made possible by the nature and purpose of thumbnail images. When a user desires the display of thumbnail images, only the outlines of the images need be identified and high resolution, or highly accurate color adjustment is not required. The present invention takes this aspect of thumbnail images into consideration in the reading of images from film so as to increase the reading speed of that film. By setting either exposure value, white balance value and focus only once, thumbnail images of adequate resolution and color accuracy may be generated, while increasing the reading speed of the film.

In accordance with embodiments of the present invention, the imaging unit captures images based upon an exposure value, white balance value and focus adjustment for an image throughout a series of images obtained through a series of photographic operations. Here, the images obtained through a series of photographic operations refers to a series of multiple images that are interrelated in some manner. Interrelated images are photographs taken of the same subject under the same photographic conditions. An example of interrelated images is the rapid and continuous shooting of photographs for a single golf swing.

Further objects of the present invention are achieved by a film image reading apparatus having a white balance value detection unit and an imaging unit. The white balance value detection unit, using an imaging circuit, detects the white balance values of the images that have been recorded on film. The imaging unit, employing a CCD and processor, captures each image on film in which multiple images have been recorded. The imaging unit captures the first image and subsequent images on the film based upon the white balance value supplied by the white balance detection value detection unit for the first image. Therefore, using this apparatus and method, it is not necessary to detect the white balance values for the other images and the time required to read multiple images recorded on the film is significantly reduced.

Still further objects of the present invention are achieved by a film image reading apparatus having a focus adjustment unit and an imaging unit. The focus adjustment unit, using an AF/zooming control circuit, executes the focus adjustment for the imaging unit. The imaging unit, employing a CCD and processor, captures each image on film in which multiple images have been recorded. The imaging unit captures the first image and subsequent images on the film based upon the focus adjustment performed by the focus adjustment unit for the first image. Therefore, using this apparatus and method, it is not necessary to refocus for each image on a film and the time required to read multiple images recorded on the film is significantly reduced.

Even further objects of the present invention are achieved by a film image reading apparatus having an imaging condition detection unit and an imaging unit. The imaging condition detection unit, employing an imaging circuit and AF\zooming control circuit, detects imaging condition values. These imaging condition values include any combination of two or more of the exposure value, the white balance values, and adjusting the focus of the images. The imaging unit, employing a CCD and processor, captures each image on film in which multiple images have been recorded. The imaging unit captures the first image and subsequent images on the film based upon the imaging condition values supplied by the imaging condition detection unit for the first image. Therefore, using this apparatus and method, it is not necessary to detect these imaging condition values for the other images and the time required to read multiple images recorded on the film is significantly reduced.

BRIEF DESCRIPTION OF THE DRAWINGS

These and other objects and advantages of the invention will become apparent and more readily appreciated for the following description of the preferred embodiments, taken in conjunction with the accompanying drawings of which.

DESCRIPTION OF THE PREFERRED EMBODIMENTS

Figure 1:
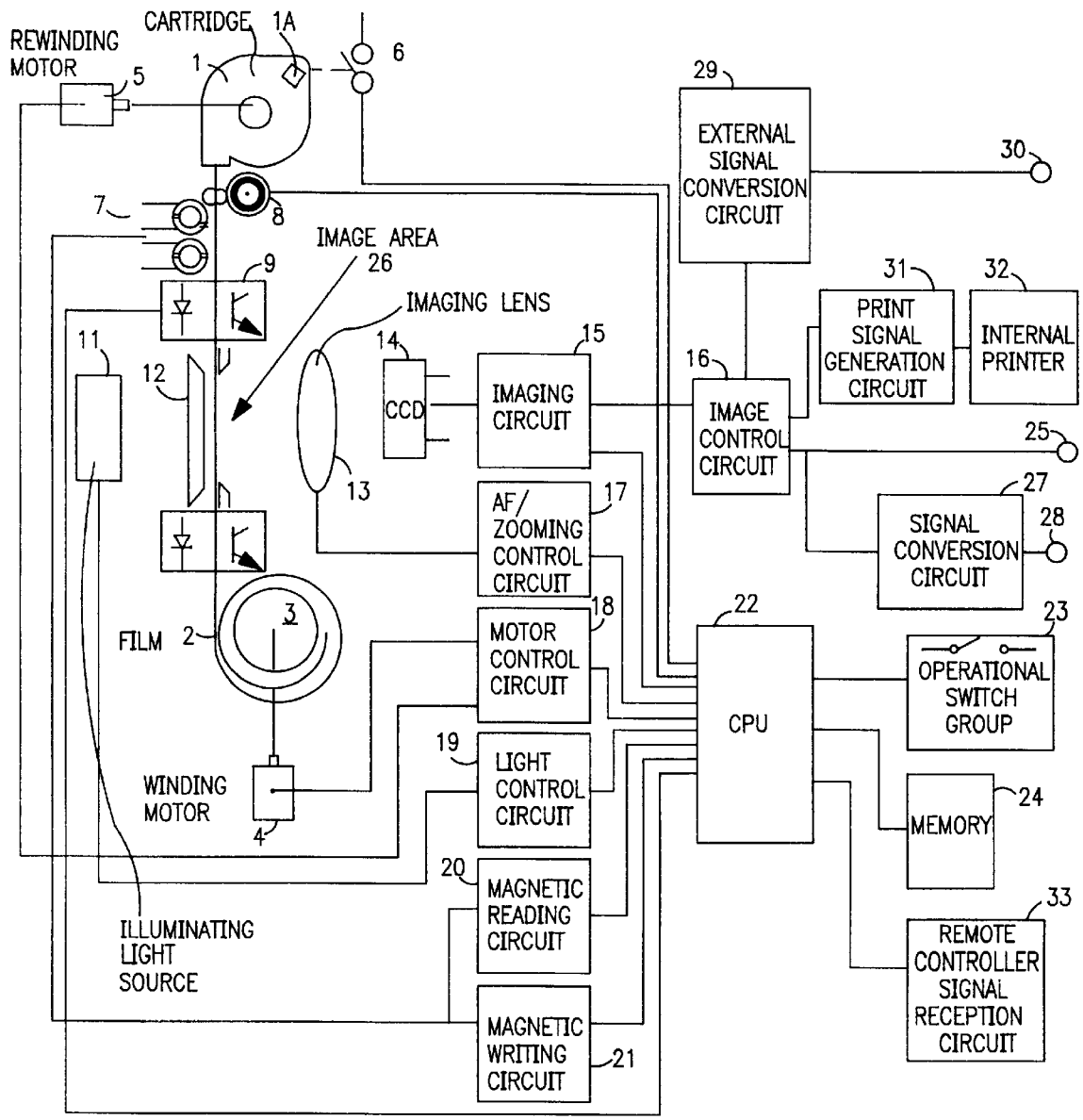
FIG. 1 is a diagram showing an overall configuration of a film image display apparatus that uses a film image reading apparatus in accordance with an embodiment of the present invention.

Reference will now be made in detail to the preferred embodiments of the present invention, examples of which are illustrated in the accompanying drawings, wherein like reference numerals refer to like elements throughout.

FIG. 1 is a diagram illustrating an overall configuration of the film image display apparatus, according to an embodiment of the present invention. Referring to FIG. 1, a film cartridge 1 having a spool shaft onto which film 2 is wound and loaded into the film image display apparatus. Film 2 has a magnetic recording area in the lower portion of each frame for recording photographic information regarding the associated frame. A film cartridge 1 containing film 2 is exposed in a photographic operation, such as by a camera not shown in FIG. 1, and is taken to a laboratory for development. Once developed, the film is placed back into the cartridge and returned to the user. On the upper part of cartridge 1, indication mechanism 1A indicates by its position whether film 2 has already been developed.

Again referring to FIG. 1, film 2 is drawn out of cartridge 1 and is wound onto take-up spool 3. As take-up spool 3 rotates by a winding motor 4 and the spool shaft inside cartridge 1 is rotated by an advancing/rewinding motor 5 (hereinafter referred to as the "rewinding motor"), film 2 is either fed out from cartridge 1 or rewound into cartridge 1. Motors 4 and 5 are connected to CPU 22 through motor control circuit 18. Also connected to CPU 22 is status detection switch 6 that is either turned on or off depending on the location of indication mechanism 1A on cartridge 1. Status detection switch 6 is turned on when indication mechanism 1A is in the position indicating that the film has been developed, while it is turned off when indication mechanism 1A indicates that the film has not been developed. The on/off status of this status detection switch 6 is entered into CPU 22.

In the location that corresponds to a magnetic recording area provided on film 2, magnetic head 7 magnetically reads or writes information on this magnetic recording area of film 2. The signal read by magnetic head 7 is amplified and decoded by magnetic reading circuit 20 and entered into CPU 22. When recording magnetically, CPU 22 drives magnetic head 7 through magnetic writing circuit 21. As indicated in FIG. 1, in the vicinity of film cartridge 1, there exists film encoder 8 which measures the velocity and distance of movement of film 2 as the film is fed. In addition, film 2 contains a set of perforations on both sides of each frame. Photo-interrupters 9 and 10, shown in FIG. 1, detect the perforations provided on film 2. The detection data output from film encoder 8, as well as photo-interrupters 9 and 10, are entered into CPU 22. Similar perforations are disclosed in U.S. Pat. No. 5,345,286.

The light from an illumination light source 11 that irradiates film 2 is caused to take on a milky white coloring and is diffused through diffusion plate 12. Diffusion plate 12 also functions as a pressure plate that regulates the film position using film thickness. The light path starting at the illumination source 11 travels through the diffusion plate 12, film 2, image area 26, imaging lens 13 and forms an image on CCD 14. Thereby, the image that has been recorded on film 2 is projected on CCD 14.

CCD 14 photoelectrically converts the projected image into an image signal. This image signal is further converted into a video signal using imaging circuit 15. This video signal is then processed by image control circuit 16 to generate a desired display image signal. The display image signal generated at image control circuit 16 is transferred to a television, video tape, or disc, not shown in FIG. 1, through video signal output terminal 25.

Connected to image control circuit 16 are signal conversion circuit 27, print signal generation circuit 31, and external signal conversion circuit 29. Signal conversion circuit 27 is used to convert the digital signal of the image into a video signal so that it may be displayed on terminal 28. Print signal generation circuit 31 converts the image signal into a format suitable for printing. Printer 32 is connected to print signal generation circuit 31. External signal conversion circuit 29 converts the image signal which has been entered at signal input terminal 30. Signal input terminal 30 is used to enter an external image signal.

Connected to CPU 22 are AF/zooming control circuit 17, motor control circuit 18, and light control circuit 19, which are all activated through instructions supplied by CPU 22. AF/zooming control circuit 17 is employed to drive imaging lens 13 in the direction of its optical axis in order to adjust the focus of the image. In addition, the AF/zooming control circuit 17 is capable of zooming on a portion of the imaging area. Motor control circuit 18 controls drive control of motors 4 and 5. Light control circuit 19 controls turning on and off illumination light source 11.

Also connected to CPU 22 are operational switch group 23, memory 24, and remote controller signal reception circuit 33. Operation switch group 23 includes several operational switches which will be discussed in detail below. Memory 24 is used to store the information read by magnetic head 7 and the image information obtained from film 2. Remote controller signal reception circuit 33 is used to receive a signal from a remote controller.

Operational switch group 23 includes a TV selection switch, an additional copy printing instruction switch, an external display switch, a winding switch and a rewinding switch. The TV type switch sets the type of television, CRT or monitor to which the apparatus of the present invention is connected. The additional copy printing instruction switch provides instruction capability for printing extra copies of each frame. The external display switch is used to instruct displaying the information sent from an externally connected personal computer. The winding switch is used to wind film 2 one frame at a time. The rewinding switch is employed to rewind film 2.

Figure 2:
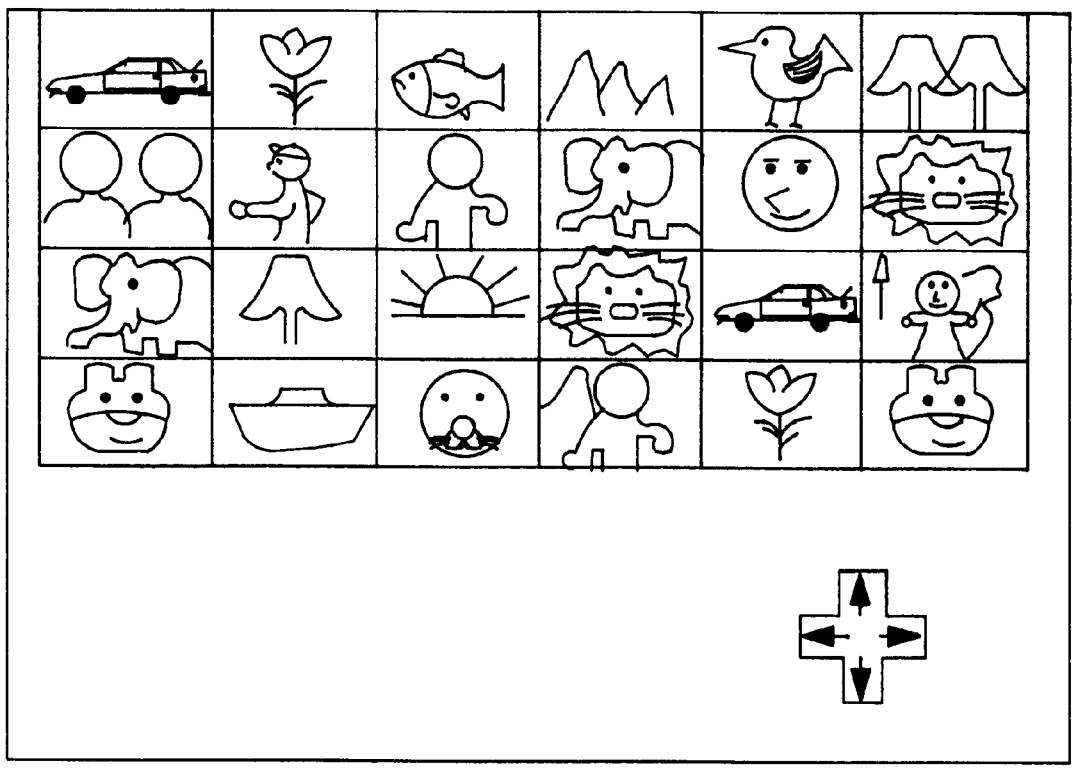
FIG. 2 is a diagram showing thumbnail images as they are displayed on a monitor in accordance with an embodiment of the present invention.
Figure 3:
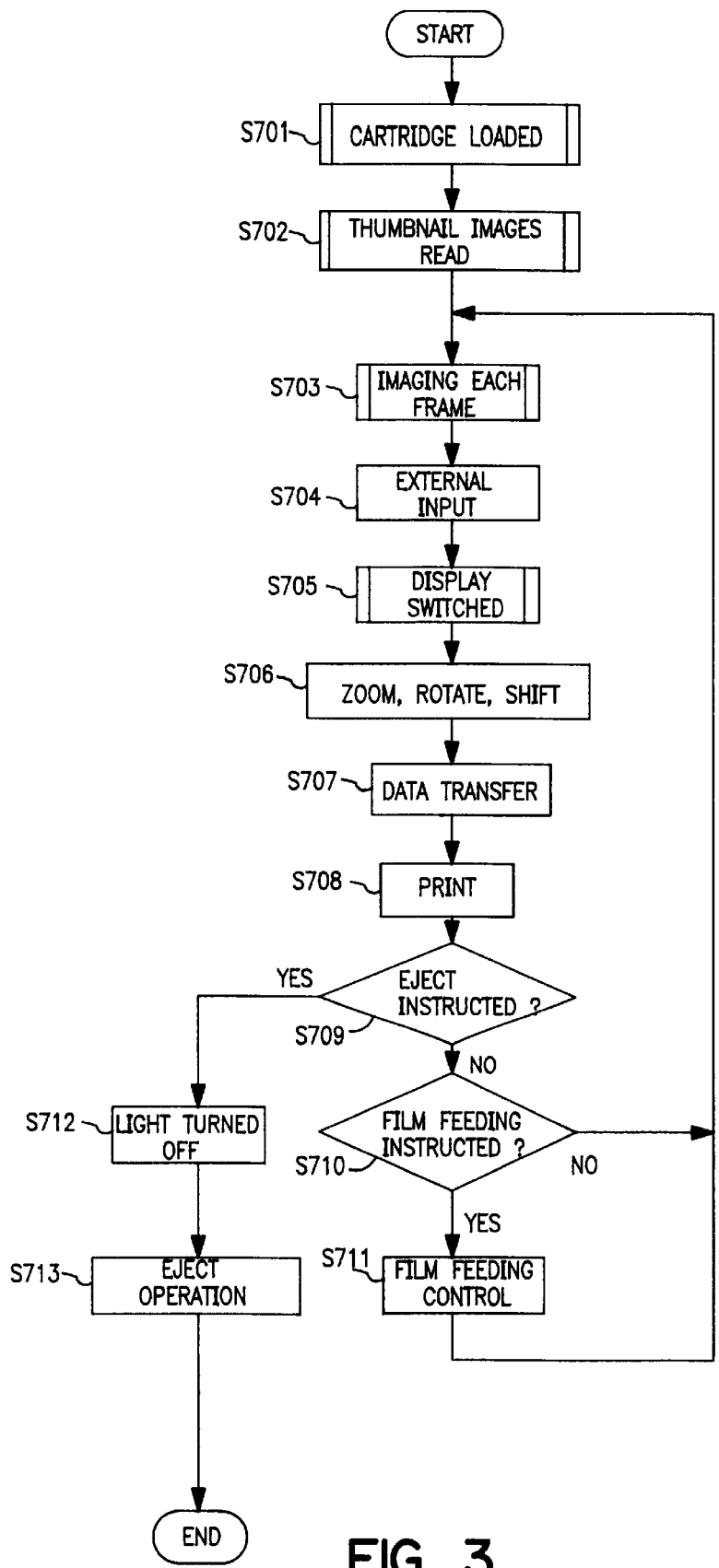
FIG. 3 is a flowchart showing the main process executed for the film image reading apparatus in accordance with an embodiment of the present invention.
Figure 4:
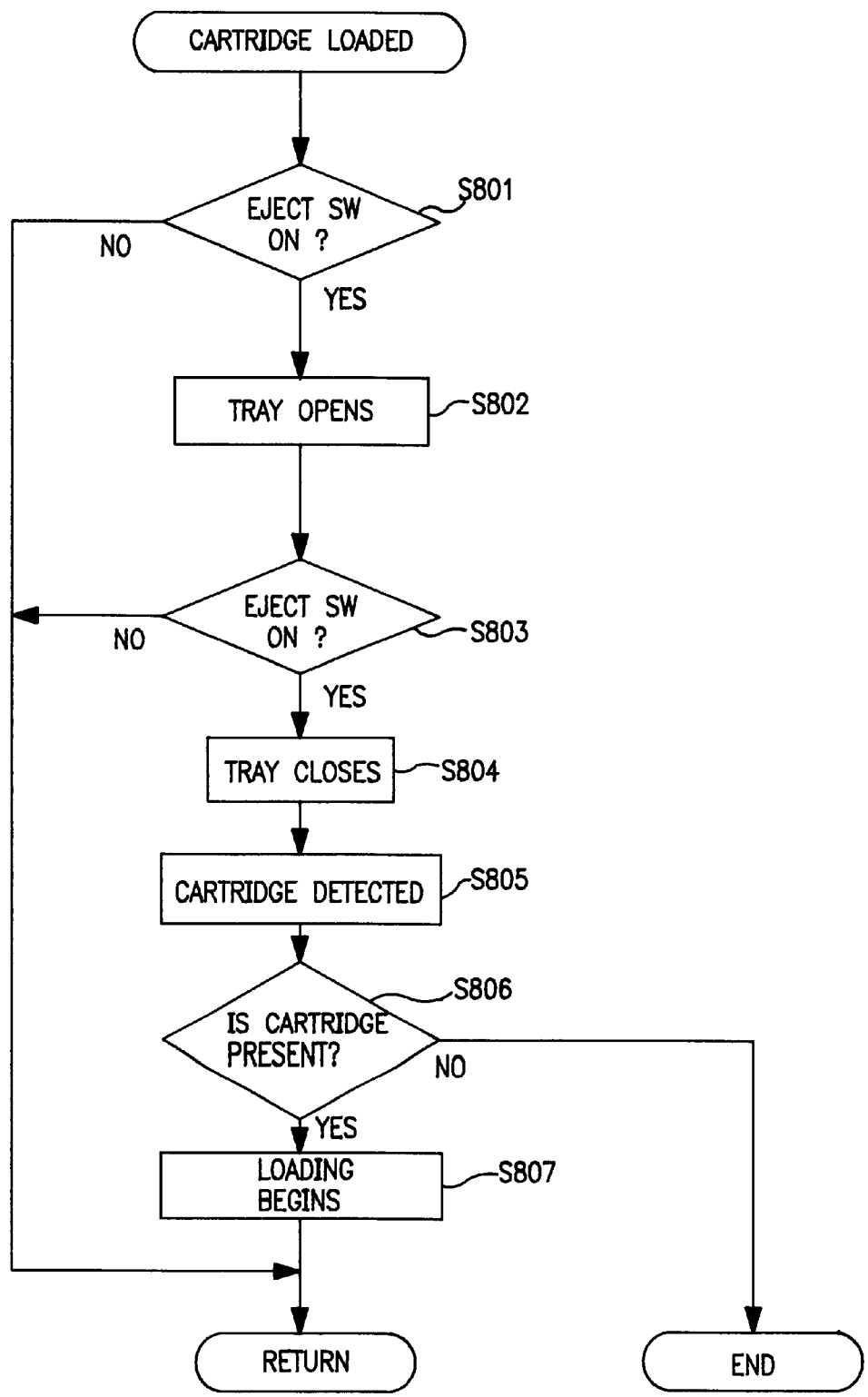
FIG. 4 is a flowchart showing a cartridge loading process in which a cartridge is placed in a tray in accordance with an embodiment of the present invention.

Referring to the flowcharts illustrated in FIGS. 3 through 8, images are read from film 2 in order to provide a thumbnail image as depicted in FIG. 2. Cartridge 1 is first loaded into the tray at step S701 in FIG. 3. A flowchart in accordance with an embodiment of the present invention for loading the cartridge is shown in FIG. 4. As shown in FIG. 4, at step S801, a determination is made as to whether the ejection switch SW is turned on. If it is turned on, at step S802, a tray onto which cartridge 1 is to be placed is opened by driving a tray motor, which is not shown in the FIG. 4. Upon loading cartridge 1 onto the tray, a determination is made, at step S803, as to whether the ejection switch SW is turned on. If the ejection switch is turned on, at step S803, the tray is closed at step S804. Then, at step S805, the presence of film cartridge 1 is determined. At step S803 of this embodiment, it is presumed that cartridge 1 is loaded onto the tray. However, opening the tray may be accomplished by turning on the ejection switch even if cartridge 1 is not loaded on a tray.

At step S806 of the method of FIG. 4, a determination is made as to whether cartridge 1 is accommodated in a tray. Processing is terminated if cartridge 1 is not present at step S806. If cartridge 1 is present then, at step S806, film 2 is advanced from cartridge 1 by driving rewinding motor 5.

At step S702, back in the flowchart illustrated in FIG. 3, thumbnail images are read. The flowchart in accordance with an embodiment of the present invention for the method of reading thumbnail images is detailed in FIG. 5. At step S901 of the method of FIG. 5, illumination light source 11 is lit by driving light control circuit 19 in order to capture the images which have been recorded in film 2 by CCD 14. Subsequently, at step S902, film 2 is advanced by rewinding motor 5, and film 2 is wound by take-up spool 3 by rotating winding motor 4 to start advancing the film. When the winding of film 2 begins, the driving of the spool shaft in cartridge 1 by rewinding motor 5 is stopped by a planetary gear, not shown in the figure. In addition, electrical power is shut off to rewinding motor 5 to stop the winding of film 2. At subsequent step S903, a determination is made as to whether a desired frame is juxtaposed with image area 26. If the frame is not so positioned, then, at step S903, the process is repeated until the frame is properly positioned. When step S903 confirms proper frame positioning, the driving of winding motor 4 is stopped at step S904. Then, at step S905, the images that have been recorded in the frame that is juxtaposed with image area 26 is captured by means of CCD 14.

Figure 6:
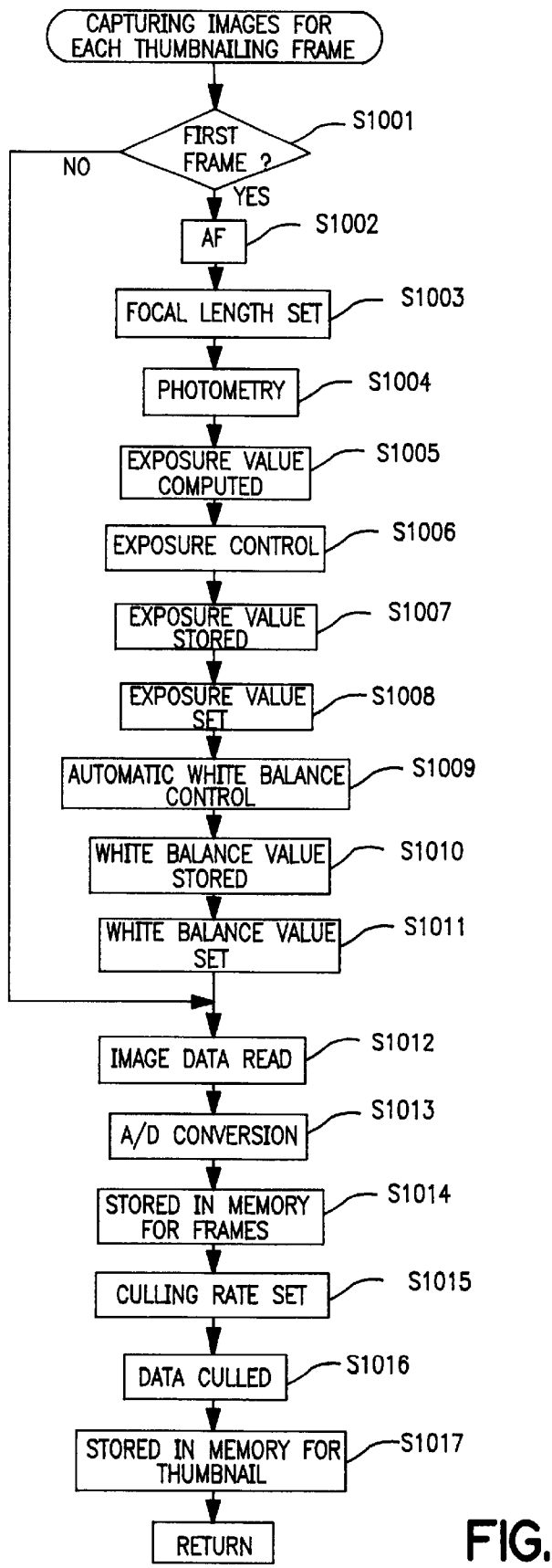
FIG. 6 is a flowchart showing an imaging process for each frame for the purpose of developing the thumbnail image in accordance with an embodiment of the present invention.

FIG. 6 shows the flowchart for the method of capturing the images on each frame for the purpose of obtaining a thumbnail image. At step S1001 of the method FIG. 6, a determination is made as to whether the frame that is juxtaposed with image area 26 is the first frame/image of film 2. Here, the first frame refers to the earliest frame for reading the thumbnail images photographed on film 2. If step S1001 determines it is not the first frame, processing proceeds to step S1012, which will be discussed in detail below.

In the case where step S1001 of the method of FIG. 6 determines that it is the first frame, AF/zooming control circuit 17 is driven to adjust the focus (AF) for the frame that is juxtaposed with image area 26, at step S1002. Then at step S1003, the focus adjustment is stopped at a position where the focus adjustment has been executed to a set focal length.

At step S1004 of the method FIG. 6, a photometric process is performed for the first frame by CCD 14. Then, at step S1005, the exposure value is computed based on this photometric result. At step S1006, the exposure is controlled by imaging circuit 15 based on the computed exposure value. At step S1007, the controlled exposure value is stored in memory 24. At step S1008, this exposure value stored in step S1007 is set.

Next, at step S1009 of FIG. 6, automatic white balance control is executed by imaging circuit 15. At step S1010, the controlled value of the auto white balance is stored in memory 24, and at step S1011, the automatic white balance value of control circuit 15 is set.

Then, at step S1012 of FIG. 6, image data is obtained by capturing the image on the first frame of film 2 by CCD 14 based on the exposure value and the white balance value that have been stored in memory 24 and the focal length that has been set at step S1003. At step S1013, the image data is converted into digital signal to obtain the frame image data. At step S1014, the frame image data is stored in memory 24. At step S1015, a subsampling rate for the digital signal is set in order to display the thumbnail images. At step S1016, the frame image data are subsampled once again to obtain the data for thumbnail images. Finally, at step S1017, the data for thumbnail images is stored in the area of memory 24 designated for the thumbnail images and the process of FIG. 6 ends.

Figure 5:
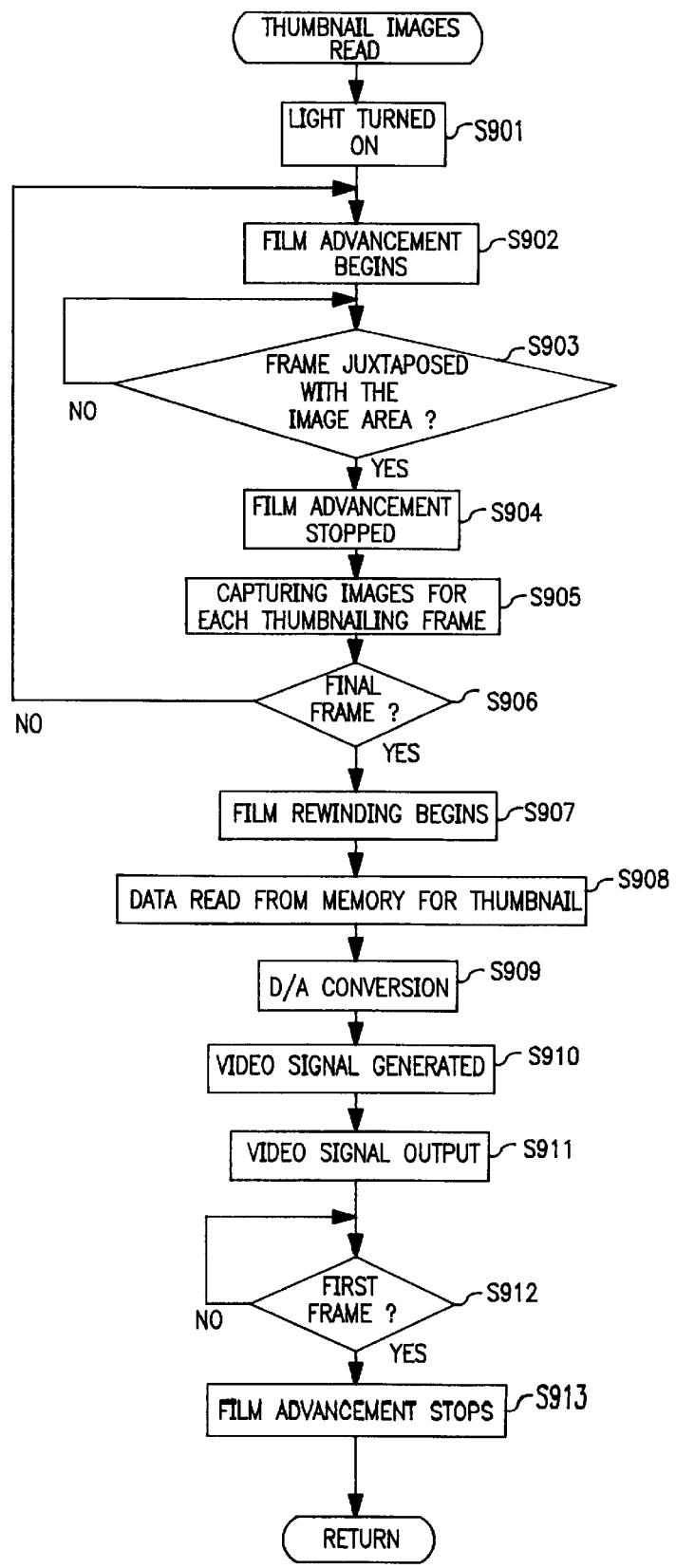
FIG. 5 is a flowchart showing a thumbnail image reading process in which developed film frames are positioned for reading in accordance with an embodiment of the present invention.

Referring to the method of FIG. 5, at step S906, a determination is made of whether the current frame that is juxtaposed with image area 26 is the final frame. If the current frame is not the final frame, the process is repeated starting from step S902 through step S905. At step S905 of FIG. 5, step S1001 of FIG. 6 is negated for all subsequent frames after the first frame and the images are read at step S1012, as shown in FIG. 6. At this time, the focal length, exposure value and white balance value obtained from the first frame are used to read the images in subsequent frames. Hereafter, the images recorded in film 2 are read in a sequential manner, and the obtained data for the thumbnail images are stored in memory designated for thumbnail images, at step S1017. Upon reading the image of the final frame, processing proceeds to step S907 of FIG. 5 and rewinding motor 5 is engaged to rewind film 2.

Referring to FIG. 5, step S908, the thumbnail image data that has been stored in the memory designated for the same is read. This thumbnail image data will become the image data displayed on a monitor screen. The read thumbnail image data is converted into analog data at step S909. Synchronous signals are added to this analog data at step S910 in order to convert them into a video signal to enable display on the monitor screen. At step S911, this video signal is output to output terminal 28 through signal conversion circuit 27. Using output terminal 28, it is possible to show status conditions, and, at this stage of processing, indicate that film 2 is being rewound. However, in this embodiment, the thumbnail images as shown in FIG. 2 are displayed on the monitor at this time. Then, at step S912, film 2 is rewound until the first frame reaches a position where it is juxtaposed with image area 26. At this point, step S913, the film advancing process is stopped.

Figure 7:
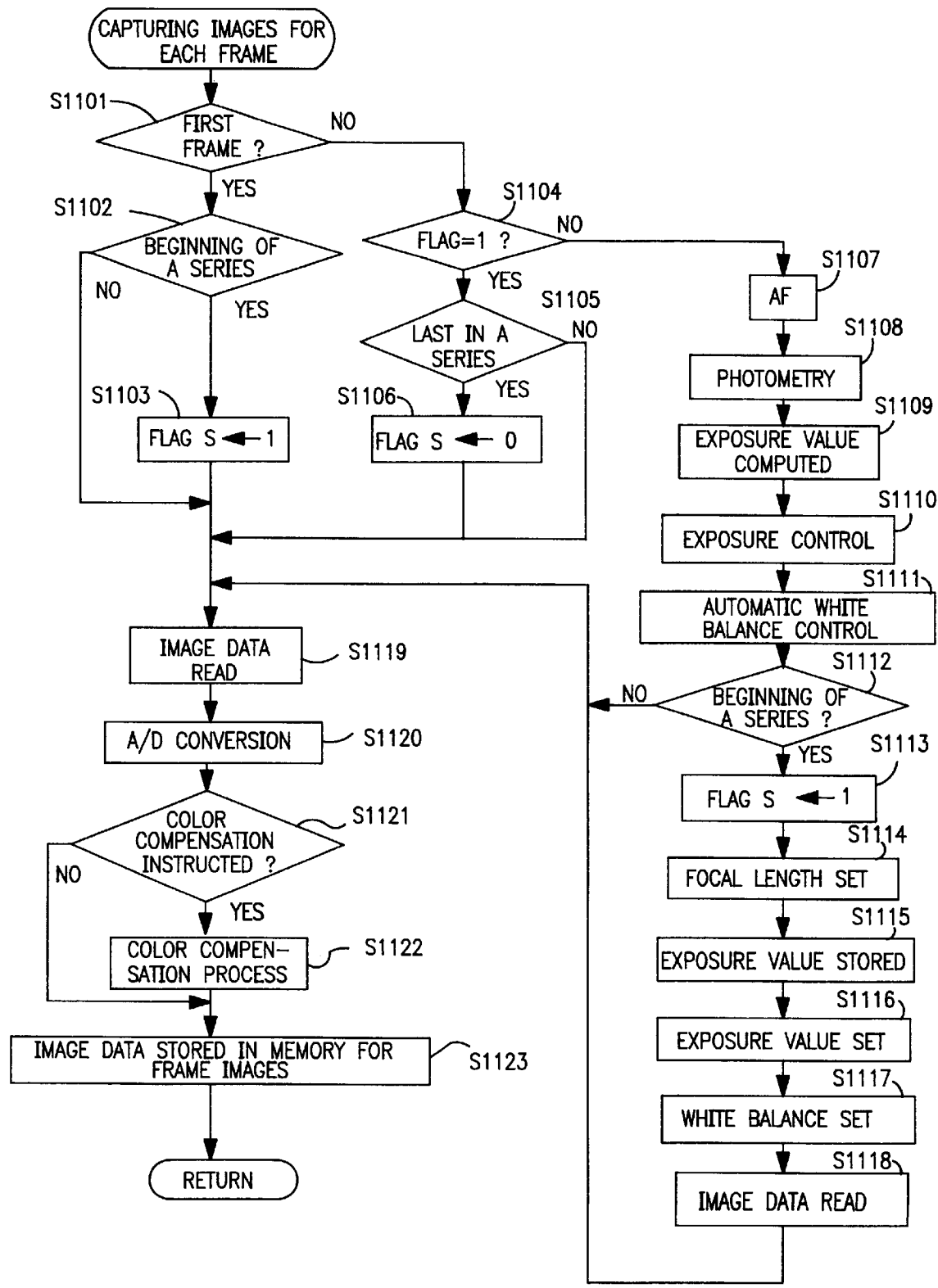
FIG. 7 is a flowchart showing an imaging process for each frame to determine the beginning of a series of photographs and use the exposure value, white balance control and focal length from the first frame for the remaining frames of the series in accordance with an embodiment of the present invention.

Referring back to the flowchart in FIG. 3, at step S703, the images on each frame are captured. FIG. 7 shows a flowchart for capturing images on each frame.

As shown in the method of FIG. 7, a determination is made as to whether the frame which is the subject of capturing its image is the first frame at step S1101. If step S1101 determines that it is the first frame, then a determination is made as to whether it is the first image of a series of images in step S1102. Here, the images from a series of photographic operations refers to a series of multiple images that are interrelated, such as, continuous photographing of a golf swing, or taking multiple photographs of the same subject under the same photographic conditions. If step S1102 determines that a series of images exist, then processing proceeds to step S1103 where flag S is set to 1 indicating a series of images. Processing then proceeds to step S1119, which will be addressed in detail later. Even when step S1102 determines a series of images does not exist, processing still proceeds to step S1119, but without setting flag S.

Again referring to FIG. 7, if step S1101 determines that it is not the first frame, a determination is made as to whether flag S is set at 1 at step S1104. If step S1104 determines that flag S has been set to 1, a determination is made as to whether the frame image to be captured is the final image of a series of images at step S1105. If step S1105 determines that the image captured is a final image of a series, then flag S which indicates a series of images is set to 0 at step S1106 and processing proceeds to step S1119. Processing still proceeds to S1119 even when steps S1105 determines that the image captured is not a final image, but without setting flag S to 0.

Referring to FIG. 7, when step S1104 determines that flag S is not equal to 1, processing proceeds to step S1107 to focus on the frame in order to capture the image. At step S1108, CCD 14 executes a photometric operation for the frame image. At step S1109, an exposure value is computed based on the results of photometry. At step S1110, imaging circuit 15 controls exposure based on the computed exposure value. Then, at step S1111, imaging circuit 15 executes an automatic white balance control and a determination is made as to whether the image is the first one of a series of images at step S1112. Processing proceeds to step S1119 if step S1112 determines that the image is not the first of a series of images. Otherwise, when the image is a first of a series, processing proceeds to step S1113 to set flag S to 1 indicating a series of images. A focal length is set at step S1114 and the exposure value is stored in memory at step S1115. The exposure value is set at step S1116. Moreover, at step S1117, a white balance value is stored in memory, and the white balance value is set at step S1118.

At step S1119 of FIG. 7, the frame images are read to obtain the frame image data. At step S1120, the frame image data is converted into a digital signal. At step S1121, a determination is made as to whether an instruction for color compensation is provided. If color compensation is desired then, at step S1122, a color compensation process is executed. At step S1123, the digital frame image data is stored in the designated memory area for such data. If in step S1121 no color compensation is desired, processing proceeds to step S1123 where the frame image data is stored in memory without executing the color compensation process.

Again referring back to FIG. 3, at step S704, a mode for introducing external images is set by selecting an external image input. At following step S705, the display is switched between the thumbnail images, the image on the frame currently being captured, and the externally entered images, according to instructions provided by the operator. The method for switching image displays is illustrated in FIG. 8 and discussed in detail below.

Figure 8:
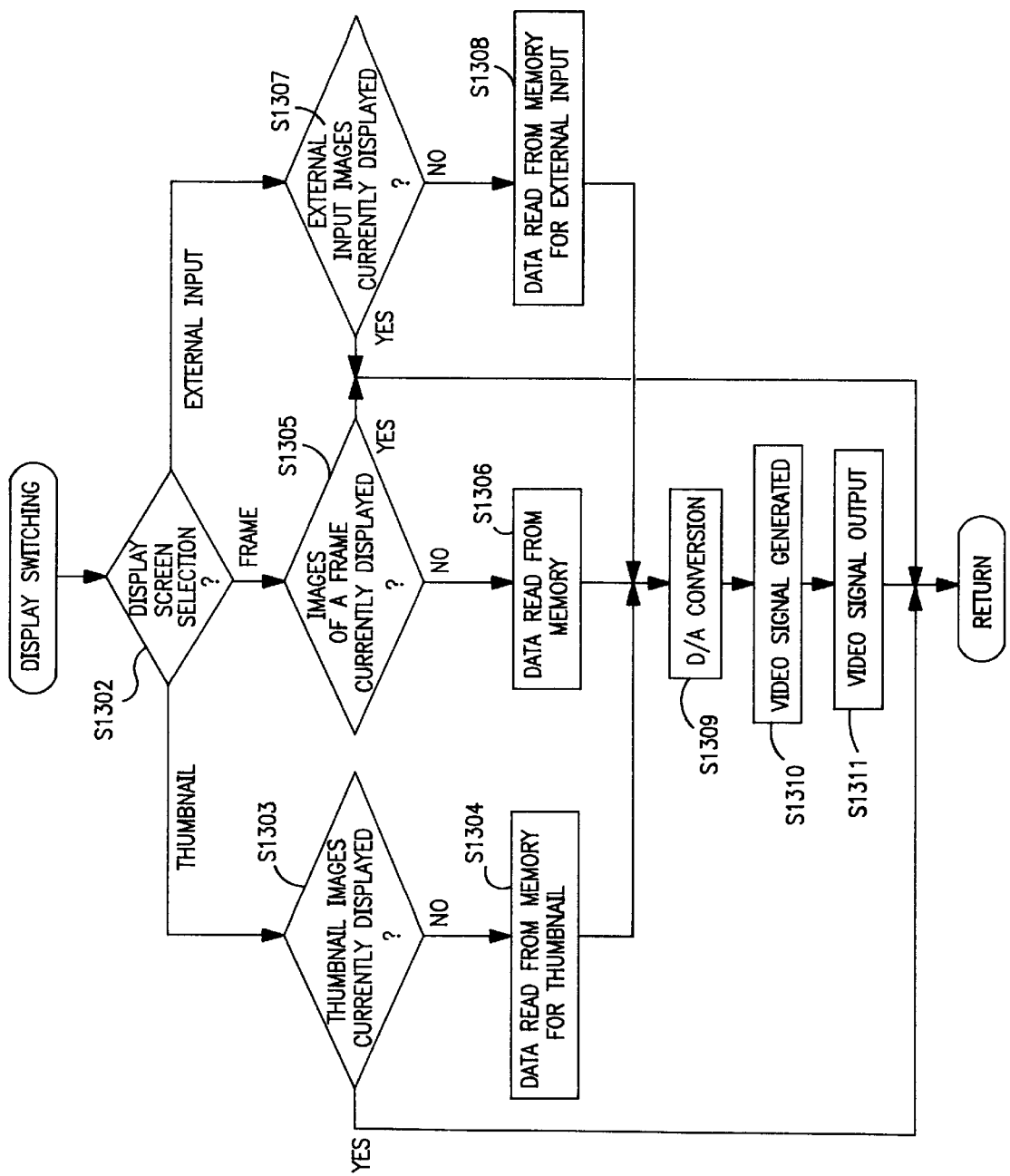
FIG. 8 is a flowchart showing a display switching process for selection of either thumbnail, frame, or external input in accordance with an embodiment of the present invention.

As shown in FIG. 8, at step S1302, a selection is made by operational switch group 23 as to which image is to be displayed among the thumbnail images, the images on the frame currently being captured, and externally entered images. At step S1302, depending upon the operator selection, processing proceeds to either, step S1303, if a thumbnail image is selected, or step S1305, if the image on the frame currently being captured is selected, or step S1307, if an external input image is selected.

In the case where a thumbnail image is selected at step S1302, a determination is made at step S1303 as to whether a thumbnail image is currently displayed. If a thumbnail image is currently displayed, processing ends for the method in FIG. 8. If it is not displayed, the thumbnail data is read from the designated memory location for thumbnail images. The thumbnail image data retrieved is converted into analog data at step S1309. Synchronization signals are added to this analog data at step S1310 in order to convert them into a video signal displayable on the monitor screen. At step S1311, the video signal is output to output terminal 28 through signal conversion circuit 27 to complete the process.

If the frame image currently being captured is selected as the display option at step S1302, a determination is made as to whether the image on the frame currently being captured is displayed. The process ends for the method of FIG. 8 if the image is currently being displayed. If it is not currently being displayed, the frame image data is read from the designated memory for frames in the execution of step S1306. As in the case thumbnail images, a video signal is obtained at step S1309 through step S1311 and output to terminal 28 to end the process of FIG. 8.

If an external input image is selected as the display option in step S1302, a determination is made as to whether an external input image is currently displayed at step S1307. If such an external image is currently displayed then processing terminates. If no such image is presently displayed, the image data is read from the designated memory for external input data at step S1308. As with thumbnail images, a video signal is obtained at step S1309 through step S1311 and output to terminal 28 to end the process of FIG. 8.

Referring back to the flowchart in FIG. 3, zooming, rotation, and lateral and vertical shifting of images are executed according to the instructions from the operator at step S706. The image data is transferred to externally connected devices, such as a personal computer, at step S707. At step S708, when an instruction to print is provided, the print of the image is output to internal printer 32 or to an externally connected printer. Subsequently, at step S709, a determination is made as to whether an instruction to eject has been received. If no request to eject has been received, a determination is made (step S710) as to whether an instruction is provided regarding film feeding operations such as winding one frame, advancing to a designated frame, or rewinding the film. If a film feeding request has been received in step S710, processing proceeds to step S703 after providing control for the feeding of film 2 based on the instruction received at step S711. Even when no film feeding instruction is received in step S710, it still proceeds to step S703. Steps S703 through step S711 are repeated until an eject instruction is received in step S709. When such an eject request is received in step S709, light control circuit 19 is driven at step S712 to turn off illumination light source 11. At step S713, film 2 is rewound and once completed, the tray is opened to complete the eject operation and processing ends for the method of FIG. 3.

As described above, with reference to the flowchart shown in FIG. 6, a focal length, exposure value and a white balance value were set with the reading of the first frame image of film 2. The images on the second and subsequent frames are read based on the focal length, the exposure value, and the white balance value received from reading the first frame. Here, thumbnail images are reductions of all the images that are recorded on film 2 so that they may be simultaneously displayed on the monitor. High resolution images are not required as long as the content of the image can be verified. Therefore, it is adequate, for the purposes of generating a thumbnail image, to read the images on the second and subsequent frames using the same focal length, exposure value, and white balance value used in reading the image on the first frame although the quality of images decreases in subsequent frames.

In the above described embodiments of the present invention, since the focal length, the exposure value, and the white balance value used in reading the image on the first frame are applied to the reading of images on subsequent frames, it is not necessary to adjust the focal length, exposure value, and the white balance value to read subsequent frames. Using this apparatus and method, the time required to capture images on every frame of film 2 in order to obtain the thumbnail images is substantially reduced.

In the above described embodiments, an explanation was provided for reading the images on the second and subsequent frames based on the focal length, the exposure value, and the white balance value used in reading the first frame. However, it is also acceptable to read the images on the second and subsequent frames based on at least one or combination of any two of the imaging conditions such as focal length, an exposure value, or a white balance value. In this case, the reading time is longer in comparison with an embodiment where the images on subsequent frames are read based on all of the imaging conditions. However, the reading time can be reduced in comparison with an apparatus where these imaging conditions are set for all the images. Moreover, the present invention may be applied to embodiments when reading a blanket image, in addition to reading the thumbnail image, and a series of images.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A film image reading apparatus, comprising:
    an exposure value detection unit to detect an exposure value of a first image recorded on a film on which a plurality of images have been recorded; and
    an imaging unit to capture said first image on said film based on said exposure value and to capture at least a one subsequent image from said plurality of images based on said exposure value of said first image.

2. A film image reading apparatus as recited in claim 1, wherein said imaging unit captures said plurality of images as thumbnail images.

3. A film image reading apparatus as recited in claim 1, wherein said imaging unit captures said plurality of images based on said exposure value if said plurality of images are obtained through a series of photographic operations.

4. A film image reading apparatus, comprising:
    a white balance value detection unit to detect a white balance value of a first image recorded on a film on which a plurality of images have been recorded; and
    an imaging unit to capture said first image on said film based on said white balance value and to capture at least a one subsequent image from said plurality of images based on said white balance value of said first image.

5. A film image reading apparatus as recited in claim 4, wherein said imaging unit captures said plurality of images as thumbnail images.

6. A film image reading apparatus as recited in claim 4, wherein said imaging unit captures said plurality of images based on said white balance value if said plurality of images are obtained through a series of photographic operations.

7. A film image reading apparatus, comprising:
    a focus adjustment unit to execute a focus adjustment on a first image recorded on a film on which a plurality of images have been recorded; and
    an imaging unit to capture said first image on said film using said focus adjustment and to capture at least a one subsequent image from said plurality of images using said focus adjustment of said first image.

8. A film image reading apparatus as recited in claim 7, wherein said imaging unit captures said plurality of images as thumbnail images.

9. A film image reading apparatus as recited in claim 7, wherein said imaging unit captures said plurality of images based on said focus adjustment if said plurality of images are obtained through a series of photographic operations.

10. A film image reading apparatus, comprising:
    an imaging condition detection unit to detect an imaging condition of a first image recorded on a film on which a plurality of images have been recorded,
        said imaging condition including at least two of an exposure value, a white balance value and a focus adjustment; and
    an imaging unit to capture said first image based on said imaging condition and at least a one subsequent image from said plurality of images on said film based on said imaging condition of said first image.

11. A method of reading film images, comprising:
    detecting an exposure value of a first image recorded on a film on which a plurality of images have been recorded; and
    capturing said first image on said film based on said exposure value and at least a one subsequent image from said plurality of images based on said exposure value of said first image.

12. A method of reading film images as recited in claim 11, wherein said capturing captures said plurality of images as thumbnail images.

13. A method of reading film images as recited in claim 11, wherein said capturing captures said plurality of images under said exposure value if said plurality of images are obtained through a series of photographic operations.

14. A method of reading film images, comprising:

detecting a white balance value of a first image recorded on a film on which a plurality of images have been recorded; and capturing said first image on said film based on said white balance value and at least a one subsequent image from said plurality of images based on said white balance value of said first image.

15. A method of reading film images as recited in claim 14, wherein said capturing captures said plurality of images as thumbnail images.

16. A method of reading film images as recited in claim 14, wherein said capturing captures said plurality of images under said white balance value if said plurality of images are obtained through a series of photographic operations.

17. A method of reading film images, comprising:

executing a focus adjustment on a first image recorded on a film on which a plurality of images have been recorded; and capturing said first image on said film using said focus adjustment and at least a one subsequent image from said plurality of images using said focus adjustment of said first image.

18. A method of reading film images as recited in claim 17, wherein said capturing captures said plurality of images as thumbnail images.

19. A method of reading film images as recited in claim 17, wherein said capturing captures said plurality of images under said focus adjustment if said plurality of images are obtained through a series of photographic operations.

20. A method of reading film images, comprising:

detecting an imaging condition of a first image recorded on a film on which a plurality of images have been recorded, said imaging condition having at least two of an exposure value, a white balance value and a focus adjustment; and capturing said first image based on said imaging condition and at least a one subsequent image from said plurality of images on said film based on said imaging condition of said first image.

\* \* \* \* \*